J. J. MORGAN.
COFFEE POT.
APPLICATION FILED APR. 16, 1910.
1,041,143.
Patented Oct. 15, 1912.
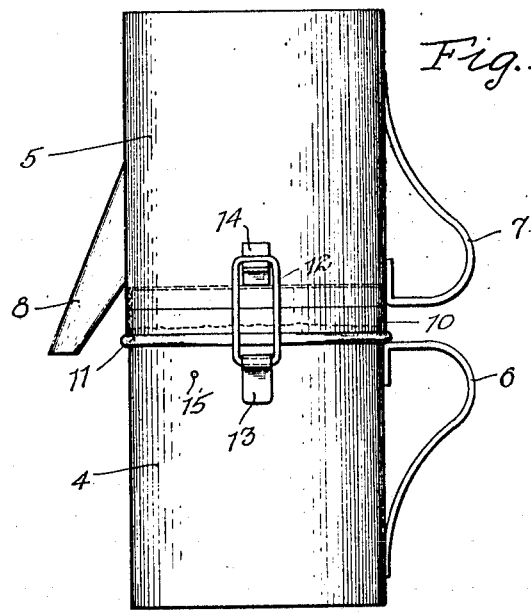
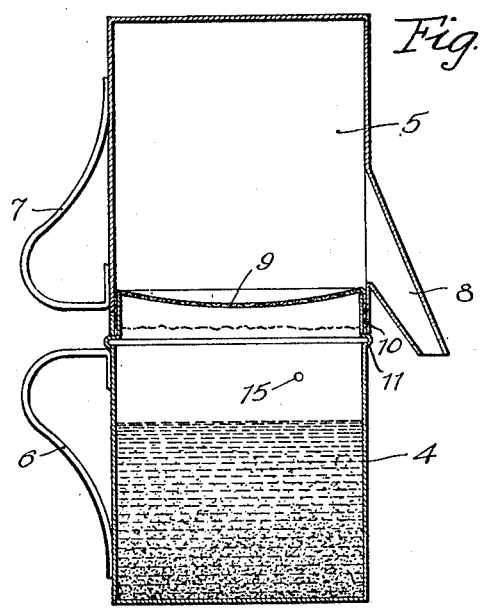
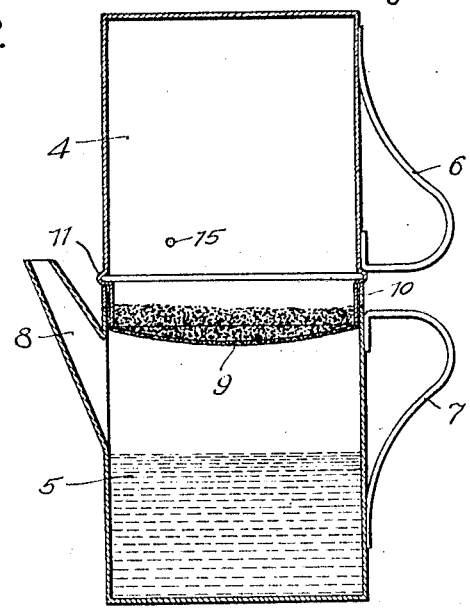
Witnesses:
Leonard W. Novander
George E. Higham
Inventor
James J. Morgan
By Morgan & Boettcher
Attorneys

UNITED STATES PATENT OFFICE.

JAMES J. MORGAN, OF CHICAGO, ILLINOIS.

COFFEE-POT.

1,041,143.　　　Specification of Letters Patent.　　Patented Oct. 15, 1912.

Application filed April 16, 1910. Serial No. 555,929.

*To all whom it may concern:*

Be it known that I, JAMES J. MORGAN, a citizen of the United States, residing at Chicago, in the county of Cook and State of Illinois, have invented new and useful Improvements in Coffee-Pots, of which the following is a full, clear, concise, and exact description, reference being had to the accompanying drawings, forming a part of this specification.

My invention relates to culinary utensils, more particularly to domestic coffee pots, and has for its object the provision of such a device which will greatly facilitate the making of coffee and which will be of simple and economical construction.

Analytically the device of my invention comprises a boiler, a strainer and a secondary receptacle. With these elements the making of the coffee is carried out by first boiling the mixture of ground coffee and water, then straining the mixture into the secondary receptacle where it remains ready for service. It is the purpose of my invention to combine the three elements for making coffee in this way in a simple structure. To this end my device is free from all complications, minute constructions, and particularly tubes and narrow passages which have been prevalent in the practical operative devices of the prior art. It is impossible, even with complicated and extended operations, to keep structures of this character more than moderately clean, and the constant presence of an old residue after some use absolutely interferes with the making of a good beverage.

The device of my invention is free from these disadvantageous features, a structure being provided whereby the desirable method of making coffee hereinbefore described may be carried on without entailing the difficulties presented by prior art contrivances.

My invention is illustrated in the accompanying drawings, reference to which will facilitate understanding of this specification and in which—

Figure 1 is an elevational view of the device. Fig. 2 is a central longitudinal section of the device and its contents in position for the primary operation of the process of making the coffee; and Fig. 3 is a similar section showing the structure in its final position.

Like reference numerals are applied to the same parts throughout the various figures.

At 4 in these drawings I have illustrated the boiler element of the device and at 5 the auxiliary or secondary receptacle thereof, the secondary receptacle being formed to telescope over the open end of the boiler element a limited distance of which more will be said hereinafter. These parts are provided with handles 6 and 7 respectively, which, when the parts are placed together, are arranged to register substantially so that they may be grasped simultaneously in the manipulation of the device. The secondary receptacle 5 is, in addition, provided with the spout 8 from which the finished coffee may be poured, all of which will be clearly pointed out hereinafter.

The straining element may be of any porous or reticulated material, herein being shown as a cloth 9 stretched across the open end of the boiler part and being held in place by the clamping action of the secondary receptacle telescoped thereon. As auxiliary means for holding the cloth in place a band 10 may be provided as shown to clamp the cloth upon the boiler, thus permitting the removal of the secondary receptacle without releasing the cloth. The boiler part is provided with the head 11, as shown, to limit the telescoping action of the parts. To lock the separative parts together as an additional precaution clamps may be provided on the outside of the structure as shown in Fig. 1. The clamps I have provided herein comprise a loop 12 hingedly mounted in a keeper 13 on the boiler and arranged to be brought into engagement with a catch lug 14 on the secondary receptacle. Such a clamp may be provided on each side.

In a device of this kind the operation is to place the ground coffee and water in the boiler whenever the mixture is boiled to the proper extent. The entire structure is then inverted to the position shown in Fig. 3 when the liquid may strain through the cloth into the secondary receptacle, the grounds remaining on the strainer as shown. In order that this straining action may take place it is necessary that air be admitted to the boiler when it is in its inverted position. To this end the prior art has contributed many and varied means which have either been inoperative or impractical.

In my device I provide a small aperture 15 (approximately one-eighth inch or less in diameter) close to or near the open end of the boiler and in the side thereof, in such position that it will be above the liquid level when the boiler is in its position, Fig. 2, but below the liquid level when the device is inverted. When the device is inverted, Fig. 3, although the liquid is in proximity to the aperture, the same will not issue therefrom.

First: The aperture is made of such size that it will not permit the simultaneous passage of air and water in opposite directions.

Second: The aperture being so adjusted that it will not permit the simultaneous passage of air and water in opposite directions, the liquid cannot isssue therefrom, since there is no manner in which air can enter the boiler to replace the liquid and it will therefore be retained by atmospheric pressure.

Third: The excess of pressure at the aperture is from without inward, since the device employs the principle of the siphon, the distance from the straining cloth to the top of the liquid representing the long arm and the distance from the top of the liquid to the aperture the short arm. Therefore the excess of pressure inward is equal to the weight of a column of liquid whose diameter is that of the stream passing through the straining cloth at the time and whose height is equal to the distance from the straining cloth to the aperture.

When the device is inverted Fig. 3, although the liquid is in proximity to the aperture, the same will not issue therefrom, the aperture being too small for the simultaneous passage of air and liquid. The air will then pass up through the liquid into the inverted boiler and the proper pressure potential will result so that the straining action may ensue. When the straining has been completed the coffee is ready to be poured from the spout and the residue on the cloth may be removed at convenience. It is evident, thus that a structure by which coffee may be made in the predescribed manner is secured without the employment of tubes, narrow passages and other complicated parts.

I claim as new and desire to secure by Letters Patent:—

1. A reversible coffee-pot consisting of a boiler, a strainer, and a secondary receptacle combined in a unitary structure, said boiler having an aperture near the open end thereof, said aperture being of such size as to prevent the simultaneous passage of air and liquid.

2. A reversible coffee-pot consisting of a boiler, a strainer and a secondary receptacle, combined in a unitary structure, said boiler having an aperture near the open end thereof, said aperture being restricted so as to prevent the simultaneous passage of air and liquid, said aperture being below the level of the liquid when the boiler is inverted.

3. In a reversible coffee-pot, a boiler, a strainer, and a secondary receptacle combined in a unitary structure, said boiler having a simple permanent aperture in the side thereof near the open end of said boiler adapted to be below the level of the liquid therein.

In witness whereof, I have hereunto subscribed my name in the presence of two witnesses.

JAMES J. MORGAN.

Witnesses:
M. J. PRENDERGAST,
ROBERT P. KEITH.